(12) United States Patent
Tabatabai et al.

(10) Patent No.: US 8,170,097 B2
(45) Date of Patent: May 1, 2012

(54) EXTENSION TO THE AVC STANDARD TO SUPPORT THE ENCODING AND STORAGE OF HIGH RESOLUTION DIGITAL STILL PICTURES IN SERIES WITH VIDEO

(75) Inventors: Ali Tabatabai, Cupertino, CA (US); Mohammed Zubair Visharam, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1182 days.

(21) Appl. No.: 11/999,377

(22) Filed: Dec. 4, 2007

(65) Prior Publication Data

US 2009/0141810 A1    Jun. 4, 2009

(51) Int. Cl.
*H04N 7/12* (2006.01)
(52) U.S. Cl. .................................. 375/240.01
(58) Field of Classification Search .................. None
See application file for complete search history.

(56) References Cited

U.S. PATENT DOCUMENTS

| | | | |
|---|---|---|---|
| 6,665,453 B2 | 12/2003 | Scheurich | |
| 6,937,273 B1 | 8/2005 | Loui | |
| 6,937,723 B2 | 8/2005 | Boland et al. | 379/406.06 |
| 6,961,083 B2 | 11/2005 | Obrador et al. | |
| 7,043,059 B2 | 5/2006 | Cheatle et al. | 382/112 |
| 7,230,986 B2 | 6/2007 | Wise et al. | |
| 7,383,288 B2 | 6/2008 | Miloushev et al. | |
| 7,705,889 B2 * | 4/2010 | Tabatabai et al. | 348/220.1 |
| 7,792,190 B2 * | 9/2010 | Watanabe et al. | 375/240.03 |
| 2003/0156652 A1 * | 8/2003 | Wise et al. | 375/240.26 |
| 2005/0084166 A1 | 4/2005 | Boneh et al. | 382/239 |
| 2005/0180505 A1 | 8/2005 | Ogawa et al. | 375/240.12 |
| 2005/0235047 A1 | 10/2005 | Li et al. | |
| 2005/0259960 A1 | 11/2005 | Wan et al. | 386/83 |
| 2005/0275752 A1 | 12/2005 | Li et al. | |
| 2006/0050785 A1 * | 3/2006 | Watanabe et al. | 375/240.03 |

(Continued)

FOREIGN PATENT DOCUMENTS

JP    2008527814    7/2008

OTHER PUBLICATIONS

Peter Schelkens,"A comparative study of scalable video coding schemes utilizing wavelet technology", www.etro.vub.ac.be.

(Continued)

*Primary Examiner* — Kevin C Harper
(74) *Attorney, Agent, or Firm* — Haverstock & Owens LLP

(57) ABSTRACT

A codec configured to operate in a sequential mode extends the current AVC standard in order to provide support for coding high resolution still image pictures within the AVC coding of a lower resolution video. The sequential mode codec is configured according to the modified AVC standard. The codec is capable of capturing an AVC video stream while concurrently capturing high resolution still images at random intervals relative to the video stream. Each captured high resolution still image is embedded within the video stream. The video stream including the embedded high resolution still images is encoded as a single layer bit stream. Each embedded high resolution still image signals or forces the start of a new GOP in the coded video sequence. The AVC standard is extended to include new syntax for the sequence parameter sets. In one embodiment, a modified sequence parameter set defines a new profile that signals the presence of a high resolution still image in sequence with AVC video.

43 Claims, 5 Drawing Sheets

U.S. PATENT DOCUMENTS

| | | | |
|---|---|---|---|
| 2006/0120450 A1 | 6/2006 | Han et al. | 375/240.03 |
| 2006/0268991 A1 | 11/2006 | Segall et al. | |
| 2007/0230566 A1* | 10/2007 | Eleftheriadis et al. | 375/240.1 |
| 2008/0082482 A1 | 4/2008 | Amon et al. | |
| 2008/0309778 A1* | 12/2008 | Tabatabai et al. | 348/222.1 |

OTHER PUBLICATIONS

Jens-Rainer, Ohm, "SVC Requirements Specified by MPEG (ISO/IEC JCT 1/SC29/WG11)", Jan. 2005, Hong Kong, China.

Babonneau, Bethelot et. al., "Proposal for SVC Streams Storage and Transport With MGS Support", ISO/IEC JT1/SC29/WG11 MPEG2005/M12036, Apr. 2005, Busan, Korea.

Visharam, M.Z. et al., "Supporting the Storage of MPEG-21: Part 13 Scalable Video by an Extension of the ISO Base Media File Format", ISO/IEC JTC1/SC29/WG11 MPEG2004/M11422, Oct. 2004, Palma de Mallorca, Spain.

* cited by examiner

EXTENSION TO THE AVC STANDARD TO SUPPORT THE ENCODING AND STORAGE OF HIGH RESOLUTION DIGITAL STILL PICTURES IN SERIES WITH VIDEO

FIELD OF THE INVENTION

The present invention relates to the field of video encoding. More particularly, the present invention relates to the field of AVC encoding and extending the current AVC standard to support the encoding and storage of high resolution digital still images along with traditionally encoded AVC video streams in an integrated series mode.

BACKGROUND OF THE INVENTION

The term "codec" refers to either "compressor/decompressor", "coder/decoder", or "compression/decompression algorithm", which describes a device or algorithm, or specialized computer program, capable of performing transformations on a data stream or signal. Codecs encode a data stream or signal for transmission, storage or encryption and decode it for viewing or editing. For example, a digital video camera converts analog signals into digital signals, which are then passed through a video compressor for digital transmission or storage. A receiving device then decompresses the received signal via a video decompressor, and the decompressed digital signal is converted to an analog signal for display. A similar process can be performed on audio signals. There are numerous standard codec schemes. Some are used mainly to minimize file transfer time, and are employed on the Internet. Others are intended to minimize the data that can be stored in a given amount of disk space, or on a CD-ROM. Each codec scheme may be handled by different programs, processes, or hardware.

A digital image is a representation of a two-dimensional image as a finite set of digital values, called picture elements or pixels. Typically, pixels are stored in computer memory as a raster image or raster map, which is a two-dimensional array of integers. These values are often transmitted or stored in a compressed form.

Digital images can be created by a variety of input devices and techniques, such as digital cameras and camcorders, scanners, coordinate-measuring machines, seismographic profiling, airborne radar, and more. They can also be synthesized from arbitrary non-image data, such as mathematical functions or three-dimensional geometric models, the latter being a major sub-area of computer graphics. The field of digital image processing is the study or use of algorithms to perform image processing on digital images. Image codecs include such algorithms to perform digital image processing.

Different image codecs are utilized to see the image depending on the image format. The GIF, JPEG and PNG images can be seen simply using a web browser because they are the standard internet image formats. The SVG format is now widely used in the web and is a standard W3C format. Other programs offer a slideshow utility, to see the images in a certain order one after the other automatically.

Still images have different characteristics than video. For example, the aspect ratios and the colors are different. As such, still images are processed differently than video, thereby requiring a still image codec for still images and a video codec, different from the still image codec, for video.

A video codec is a device or software module that enables the use of data compression techniques for digital video data. A video sequence consists of a number of pictures (digital images), usually called frames. Subsequent frames are very similar, thus containing a lot of redundancy from one frame to the next. Before being efficiently transmitted over a channel or stored in memory, video data is compressed to conserve both bandwidth and memory. The goal of video compression is to remove the redundancy, both within frames (spatial redundancy) and between frames (temporal redundancy) to gain better compression ratios. There is a complex balance between the video quality, the quantity of the data needed to represent it (also known as the bit rate), the complexity of the encoding and decoding algorithms, their robustness to data losses and errors, ease of editing, random access, end-to-end delay, and a number of other factors.

A typical digital video codec design starts with the conversion of input video from a RGB color format to a YCbCr color format, and often followed by chroma sub-sampling to produce a sampling grid pattern. Conversion to the YCbCr color format improves compressibility by de-correlating the color signals, and separating the perceptually more important luma signal from the perceptually less important chroma signal, and which can be represented at lower resolution.

Some amount of spatial and temporal down-sampling may also be used to reduce the raw data rate before the basic encoding process. Down-sampling is the process of reducing the sampling rate of a signal. This is usually done to reduce the data rate or the size of the data. The down-sampling factor is typically an integer or a rational fraction greater than unity. This data is then transformed using a frequency transform to further de-correlate the spatial data. One such transform is a discrete cosine transform (DCT). The output of the transform is then quantized and entropy encoding is applied to the quantized values. Some encoders can compress the video in a multiple step process called n-pass encoding, for example 2-pass, which is generally a slower process, but potentially provides better quality compression.

The decoding process consists of essentially performing an inversion of each stage of the encoding process. The one stage that cannot be exactly inverted is the quantization stage. There, a best-effort approximation of inversion is performed. This part of the process is often called "inverse quantization" or "dequantization", although quantization is an inherently non-invertible process.

A variety of codecs can be easily implemented on PCs and in consumer electronics equipment. Multiple codecs are often available in the same product, avoiding the need to choose a single dominant codec for compatibility reasons.

Some widely-used video codecs include, but are not limited to, H.261, MPEG-1 Part 2, MPEG-2 Part 2, H.263, MPEG-4 Part 2, MPEG-4 Part 10/AVC, DivX, XviD, 3ivx, Sorenson 3, and Windows Media Video (MWV).

H.261 is used primarily in older videoconferencing and videotelephony products. H.261 was the first practical digital video compression standard. Essentially all subsequent standard video codec designs are based on it. It included such well-established concepts as YCbCr color representation, the 4:2:0 sampling format, 8-bit sample precision, 16×16 macroblocks, block-wise motion compensation, 8×8 block-wise discrete cosine transformation, zig-zag coefficient scanning, scalar quantization, run+value symbol mapping, and variable-length coding. H.261 supported only progressive scan video.

MPEG-1 Part 2 is used for Video CDs (VCD), and occasionally for online video. The quality is roughly comparable to that of VHS. If the source video quality is good and the bitrate is high enough, VCD can look better than VHS, however, VCD requires high bitrates for this. VCD has the highest compatibility of any digital video/audio system, as almost every computer in the world can play this codec. In terms of technical design, the most significant enhancements in MPEG-1 relative to H.261 were half-pel and bi-predictive motion compensation support. MPEG-1 supported only progressive scan video.

MPEG-2 Part 2 is a common-text standard with H.262 and is used on DVD and in most digital video broadcasting and cable distribution systems. When used on a standard DVD, MPEG-2 Part 2 offers good picture quality and supports widescreen. In terms of technical design, the most significant enhancement in MPEG-2 relative to MPEG-1 was the addition of support for interlaced video. MPEG-2 is considered an aging codec, but has significant market acceptance and a very large installed base.

H.263 is used primarily for videoconferencing, videotelephony, and internet video. H.263 represented a significant step forward in standardized compression capability for progressive scan video. Especially at low bit rates, H.263 could provide a substantial improvement in the bit rate needed to reach a given level of fidelity.

MPEG-4 Part 2 is an MPEG standard that can be used for internet, broadcast, and on storage media. MPEG-4 Part 2 offers improved quality relative to MPEG-2 and the first version of H.263. Its major technical features beyond prior codec standards consisted of object-oriented coding features. MPEG-4 Part 2 also included some enhancements of compression capability, both by embracing capabilities developed in H.263 and by adding new ones such as quarter-pel motion compensation. Like MPEG-2, it supports both progressive scan and interlaced video.

MPEG-4 Part 10 is a technically aligned standard with the ITU-T's H.264 and is often also referred to as AVC. MPEG-4 Part 10 contains a number of significant advances in compression capability, and it has recently been adopted into a number of company products.

DivX, XviD and 3ivx are video codec packages basically using MPEG-4 Part 2 video codec, with the *.avi, *.mp4, *.ogm or *.mkv file container formats. Sorenson 3 is a codec that is popularly used by Apple's QuickTime, basically the ancestor of H.264. Many of the Quicktime Movie trailers found on the web use this codec. WMV (Windows Media Video) is Microsoft's family of video codec designs including WMV 7, WMV 8, and WMV 9. WMV can be viewed as a version of the MPEG-4 codec design.

MPEG codecs are used for the generic coding of moving pictures and associated audio. MPEG video codecs create a compressed video bit-stream traditionally made up of a series of three types of encoded data frames. The three types of data frames are referred to as an intra frame (called an I-frame or I-picture), a bi-directional predicated frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame display order. Such frames are usually predicted from two directions, for example from the I- or P-frames that immediately precede or the P-frame that immediately follows the predicted frame. These bidirectionally predicted frames are called B-frames.

There are many possible GOP structures. A common GOP structure is 15 frames long, and has the sequence I_BB P_BB_P_BB_P_BB_P_BB_. A similar 12-frame sequence is also common. I-frames encode for spatial redundancy, P and B-frames for temporal redundancy. Because adjacent frames in a video stream are often well-correlated, P-frames may be 10% of the size of I-frames, and B-frames 2% of their size. However, there is a trade-off between the size to which a frame can be compressed versus the processing time and resources required to encode such a compressed frame. The ratio of I, P and B-frames in the GOP structure is determined by the nature of the video stream and the bandwidth constraints on the output stream, although encoding time may also be an issue. This is particularly true in live transmission and in real-time environments with limited computing resources, as a stream containing many B-frames can take much longer to encode than an I-frame-only file.

B-frames and P-frames require fewer bits to store picture data, as they generally contain difference bits for the difference between the current frame and a previous frame, subsequent frame, or both. B-frames and P-frames are thus used to reduce the redundant information contained across frames. A decoder in operation receives an encoded B-frame or encoded P-frame and uses a previous or subsequent frame to reconstruct the original frame. This process is much easier than reconstructing each original frame independently and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frame or B-frame is associated with an area in the previous or next image that it is well-correlated with, as selected by the encoder using a "motion vector" that is obtained by a process termed "Motion Estimation." The motion vector that maps the current macroblock to its correlated area in the reference frame is encoded, and then the difference between the two areas is passed through the encoding process.

Conventional video codecs use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding, which is the approach used in the MPEG standards.

The output bit-rate of an MPEG encoder can be constant or variable, with the maximum bit-rate determined by the playback media. To achieve a constant bit-rate, the degree of quantization is iteratively altered to achieve the output bit-rate requirement. Increasing quantization leads to visible artifacts when the stream is decoded. The discontinuities at the edges of macroblocks become more visible as the bit-rate is reduced.

The AVC (H.264) standard supports quality video at bit-rates that are substantially lower than what the previous standards would need. This functionality allows the standard to be applied to a very wide variety of video applications and to work well on a wide variety of networks and systems. Although the MPEG video coding standards specify general coding methodology and syntax for the creation of a legitimate MPEG video bit-stream, the current standards do not provide support for encoding and storing randomly captured high resolution still images along with the encoded video data.

SUMMARY OF THE INVENTION

A codec configured to operate in a sequential mode extends the current AVC standard in order to provide support for coding high resolution still image pictures within the AVC coding of a lower resolution video. The sequential mode codec is configured according to the modified AVC standard. The codec is capable of capturing an AVC video stream while concurrently capturing high resolution still images at random intervals relative to the video stream. Each captured high resolution still image is embedded within the video stream. The video stream including the embedded high resolution still images is encoded as a single layer bit stream. Each embedded high resolution still image signals or forces the start of a new GOP in the coded video sequence. The single-layer bit stream is transmitted from an encoder on the transmission side to a decoder on the receiving side.

To include the embedded high resolution still images in a video stream, the AVC standard is extended to include new syntax for the sequence parameter sets. In one embodiment, a modified sequence parameter set defines a new profile that signals the presence of a high resolution still image in sequence with AVC video.

In one aspect, a method of encoding data is described. The method includes capturing a video stream of data, wherein the video stream includes a plurality of successive video frames of data, capturing one or more still images, wherein each still image is captured at a random interval of time relative to the video stream, embedding each still image within the video frames in series, thereby forming a combined data stream, signaling a presence of a high resolution still image by using a new profile definition in a modified sequence parameter set, encoding the combined data stream, and transmitting the encoded combined data stream as a single-layer transmission. The method can also include down-sampling each captured high resolution still image and storing a down-sampled version of each still image for use as a reference image for subsequent frames in the video stream. The method can also include converting image characteristics associated with each captured still image to video characteristics such that the down-sampled version of each still image matches the characteristics of the video. Encoding the combined data stream can include encoding the video frames according to the down-sampled version of each still image. Each embedded still image can indicate a new GOP. Each still image can be randomly embedded within the combined data stream. Each GOP can be variable in size. The combined data stream can be encoded according to a modified AVC standard. The method can also include receiving the single-layer transmission, detecting an occurrence of each embedded still image by a presence of a modified sequence parameter set, decoding each detected still image, and decoding each video frame. The method can also include down-sampling each decoded still image and storing a down-sampled version of each still image. The method can also include converting image characteristics associated with each decoded still image to video characteristics such that the down-sampled version of each still image matches the characteristics of the video stream. Decoding each video frame can include decoding each video frame according to the down-sampled version of each still image if the still image is used as a reference for prediction. Each still image can comprise a high resolution still image. Each video frame can comprise a low resolution video frame. A frame rate of the video stream can be independent of a frame rate of the one or more still images.

In another aspect, a system to encode-data is described. The system includes a video capturing module to capture a video stream of data, wherein the video stream includes a plurality of successive video frames of data, a still image capturing module to capture one or more still images, wherein each still image is captured at a random interval of time relative to the video stream, a processing module to embed each captured still image within the video frames and to set a modified sequence parameter set to signal a presence of each still image, thereby generating a combined data stream, an encoder to encode the combined data stream, thereby forming an encoded combined data stream, and a transmitter to transmit the encoded combined data stream as a single-layer transmission. The encoder can include a down-sampling module to down-sample each still image and a buffer to store a down-sampled version of each still image. The encoder can be configured to convert image characteristics associated with each captured still image to video characteristics such that the down-sampled version of each still image matches the characteristics of the video. The encoder can be configured to encode the combined data stream by encoding the video frames according to the down-sampled version of each still image. The processing module can be configured to define a modified sequence parameter set and add the parameter set at every occurrence of the still image in the video stream to signal a presence of the still image and start of a new GOP. The processing module can also be configured to define one or more still image parameters, wherein each still image parameter defines a characteristic of the still image such as one or more of image height and image width. Each embedded still image can indicate a new GOP. Each still image can be randomly embedded within the combined data stream. Each GOP can be variable in size. The combined data stream can be encoded according to a modified AVC standard. Each still image can comprise a high resolution still image. Each video frame can comprise a low resolution video frame. A frame rate of the video stream can be independent of the frame rate of the one or more still images.

In yet another aspect, a system to decode data is described. The system includes a receiver to receive an encoded data stream as a single-layer transmission, wherein the encoded data stream includes one or more still images embedded within a plurality of video frames, a processing module to detect a presence of an embedded still image by parsing contents of a modified sequence parameter set, and a decoder to decode each still image embedded within the encoded data stream and to decode each encoded video frame to form a video stream of data, wherein each still image is decoded at a random interval of time relative to the video stream. The decoder can include a down-sampling module to down-sample each still image and a buffer to store a down-sampled version of each still image. The decoder can be configured to convert image characteristics associated with each decoded still image to video characteristics such that the down-sampled version of each still image matches characteristics of the video stream. The decoder can be configured to decode each encoded video frame by decoding each appropriate video frame according to the down-sampled version of each still image when the still image is used as a reference. The processing module can be configured to detect one or more still image parameters, wherein each still image parameter defines a characteristic of the still image such as one or more of image height and image width. Each embedded still image can indicate a new GOP. Each still image can be randomly embedded within the encoded data stream. Each GOP can be variable in size. The encoded data stream can be encoded according to a modified AVC standard. Each still image can comprise a high resolution still image. Each video frame can comprise a low resolution video frame. A frame rate of the video stream can be independent of a frame rate of the one or more still images.

In still yet another aspect, a system to encode and decode data is described. The system includes a video capturing module to capture a first video stream of data, wherein the first video stream includes a plurality of successive video frames of data, a still image capturing module to capture one or more still images, wherein each still image is captured at a random interval of time relative to the first video stream, a processing module to embed each captured still image within the video frames of the first video stream and to set a sequence parameter set to signal a presence of the still image, thereby generating a first data stream, an encoder to encode the first data stream, thereby forming a first encoded data stream, a transceiver to transmit the first encoded data stream as a first single-layer transmission, and to receive a second encoded data stream as a second single-layer transmission, and a decoder to decode each still image embedded within the second encoded data stream and to decode each encoded video frame within the second encoded data stream to form a second video stream of data. The encoder can include a down-sampling module to down-sample each still image and a buffer to store a down-sampled version of each still image. The decoder can include a down-sampling module to down-sample each still image and a buffer to store a down-sampled version of each still image.

BRIEF DESCRIPTION OF THE DRAWINGS

Embodiments of the sequential mode codec are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

A sequential mode method, also referred to as a single layer method, supports the addition of a still image coding feature to AVC. The AVC standard is extended to support the coding of high resolution still images at higher spatial resolution when compared to the neighboring P-pictures, B-pictures, or I-pictures in an AVC formatted video stream. The method is referred to as a sequential method in that the high resolution still images are embedded within the video stream to form a single layer. The sequential method enables a high resolution still image to be captured at random intervals and subsequently embedded in the video stream. In this sense, the single layer data stream including one or more high resolution still images randomly embedded within the AVC video stream becomes a series of variably sized GOPs.

While capturing video using the sequential mode and coding with AVC, when the user desires a higher resolution still image, the start of a new GOP or S-I (still image) picture is signaled in the coded video sequence. This "S-I-picture" has a much higher spatial resolution than the normal video sequence. At the same time, the S-I-picture is able to be independently decoded thereby providing random access capabilities. The S-I-picture also includes image characteristics instead of video characteristics where characteristics could mean a difference in color mapping. Still images have different characteristics than video, such as different aspect ratios and colors. As such, a S-I-picture generally includes different characteristics than an I-picture, P-picture, or B-picture associated with the video stream. The S-I-pictures associated with the high resolution still images are different than the I-pictures associated with the video stream. There are occurrences where the randomness of the S-I-pictures results in the alignment of a particular S-I-picture with the GOP of the video stream. In one embodiment of this case, the S-I-picture takes the place of the I-picture in the single layer data stream. Due to the randomness of capturing the high resolution still images, the alignment of an S-I-picture to the GOP of the video stream varies in frequency, and may not occur at all.

Figure 1:
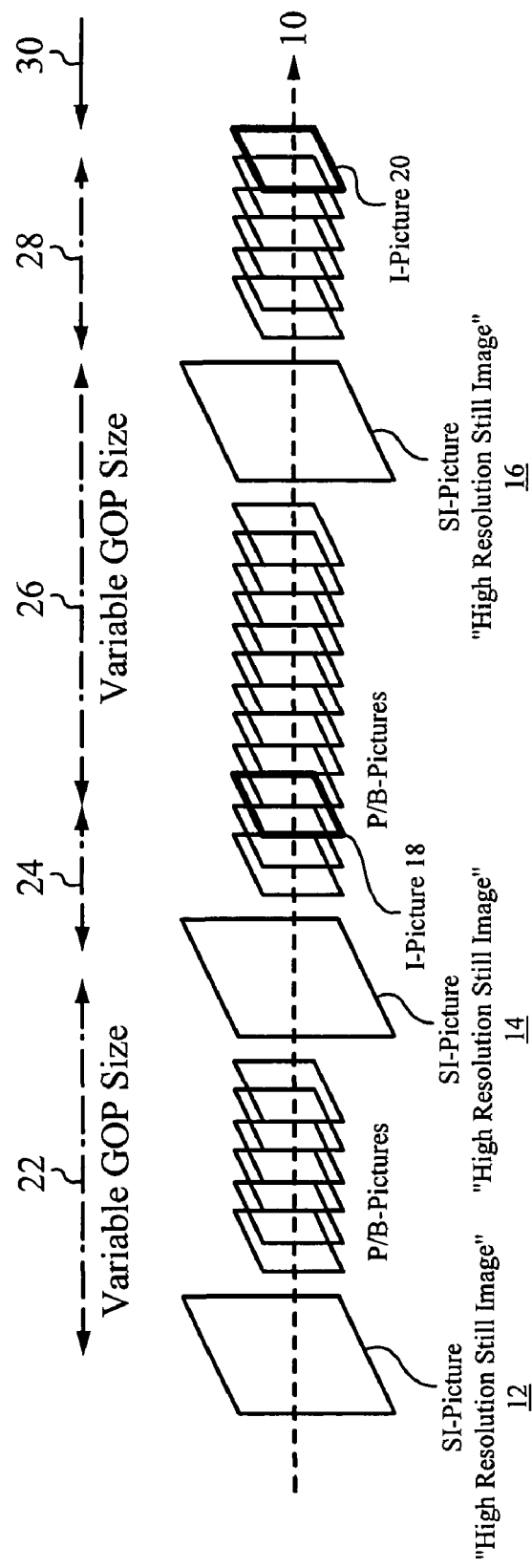
FIG. 1 illustrates a sequential mode using a modified AVC standard to embed high resolution still images within a video stream.

FIG. 1 illustrates a sequential mode using a modified AVC standard to store high resolution still images. A modified AVC formatted data stream 10 includes high resolution still images embedded within AVC formatted video frames. The AVC formatted video frames comprise P-pictures, B-pictures, and I-pictures as are well known in the art. Each high resolution still image is represented as an S-I-picture, which is randomly interspersed within the video frames. An AVC video stream is configured according to a determined GOP, where each I-picture signifies the beginning of a new GOP. In a modified AVC data stream, each S-I-picture also signifies the beginning of a new GOP. Since a high resolution still image can be captured at any random instant of time, a corresponding S-I-picture can be embedded at any random position within the modified AVC video stream. As such, each GOP within the modified AVC data stream is variable in terms of size.

The modified AVC data stream 10 in FIG. 1 illustrates an exemplary series of video frames, including the I-pictures 18 and 20, and high resolution still images, including the S-I-pictures 12, 14, and 16. Each S-I-picture and each I-picture mark the beginning of a new GOP. In reference to the modified AVC data stream 10, the GOP 22 is aligned to begin at the S-I-picture 12, the GOP 24 is aligned to begin at the S-I-picture 14, the GOP 26 is aligned to begin at the I-picture 18, the GOP 28 is aligned to begin at the S-I-picture 16, and the GOP 30 is aligned to begin at the I-picture 20.

Since the high resolution still images are captured at random intervals, there are occurrences where an S-I-picture aligns with an I-picture. In one embodiment of this case, the I-picture is replaced by the S-I-picture. The high resolution still images are configured as S-I-pictures. The S-I-pictures are embedded within the I-pictures, P-pictures, and B-pictures of the video stream. According to the AVC standard, the P-pictures, and the B-pictures can be predicted from the I-pictures. However, in the case where an I-picture is replaced by an S-I-picture, or when an S-I-picture signals the start of a new GOP, the S-I-picture is used as a starting point or reference to predict the subsequent P-pictures and the B-pictures. Since the S-I-picture is at a higher resolution than the neighboring P and B pictures, the S-I-picture is down-sampled to a resolution of the video. Additionally, the image characteristics defined by the S-I-picture must be converted to appropriate video characteristics to be used in predicting the P-pictures and the B-pictures. Basically, if a high resolution still image is to be used as a reference in the encoding of video, the high resolution still image is down-sampled, and the image characteristics are converted to video characteristics to properly format for video instead of still images.

The modified AVC standard enables each high resolution still image to be captured at any random interval. In other words, the frame rate of the S-I-pictures does not need to match, or be a multiple of, the frame rate of the AVC video stream, although in some circumstance the frame rates are equal. As opposed to conventional codecs that require residual information to be generated at a fixed rate relative to the video stream, the sequential mode codec configured according to the modified AVC standard is not encumbered by such a requirement. The high resolution still images transmitted using the sequential mode codec are at a random frame rate, or are at a frame rate independent of the frame rate for the video stream.

Figure 2:
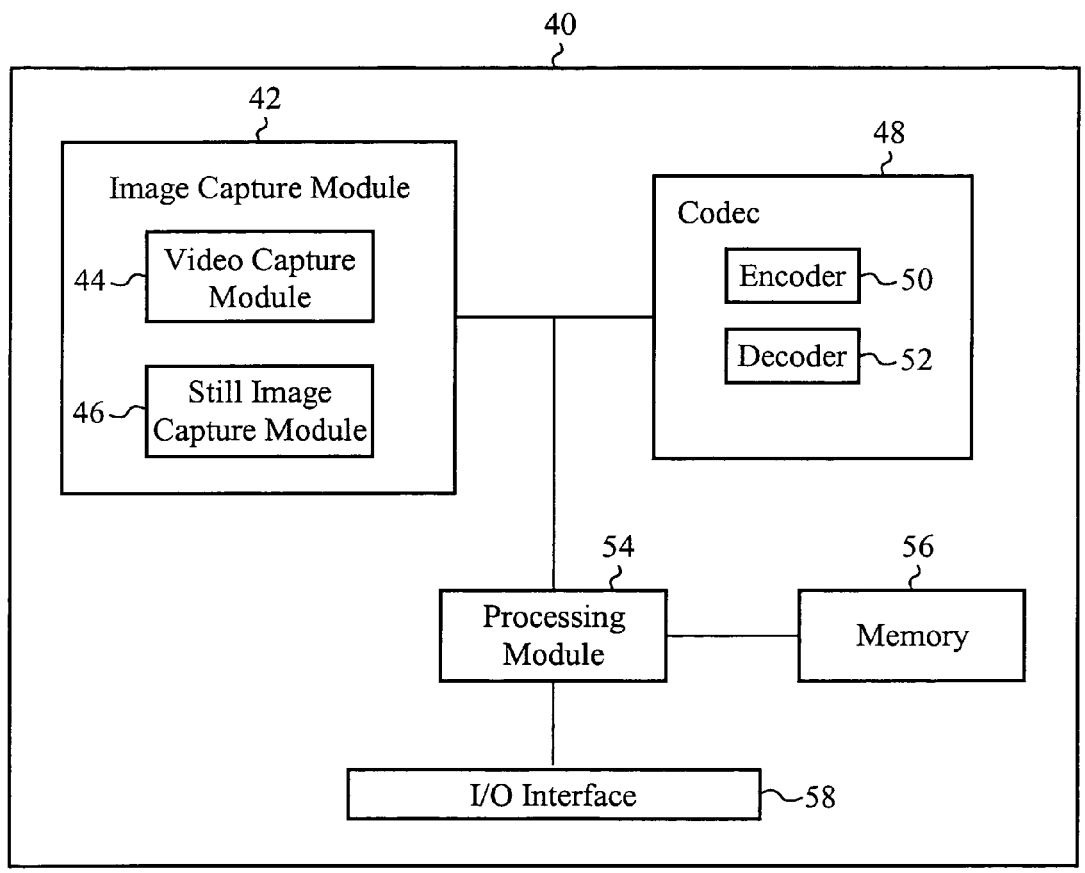
FIG. 2 illustrates a block diagram of an exemplary imaging system configured to operate in the sequential mode.

FIG. 2 illustrates a block diagram of an exemplary imaging system 40 configured to operate in the sequential mode. The imaging system 40 includes an image capture module 42, a codec 48, a processing module 54, a memory 56, and an input/output (I/O) interface 58. The I/O interface 58 includes a user interface and a network interface for transmitting and receiving data. The memory 56 is any conventional type of data storage medium, either integrated or removable. The codec 48 includes an encoder 50 and a decoder 52. The image capture module 42 includes a video capture module 44 for capturing low resolution video and a still image capture module 46 for capturing high resolution still images.

Figure 3:
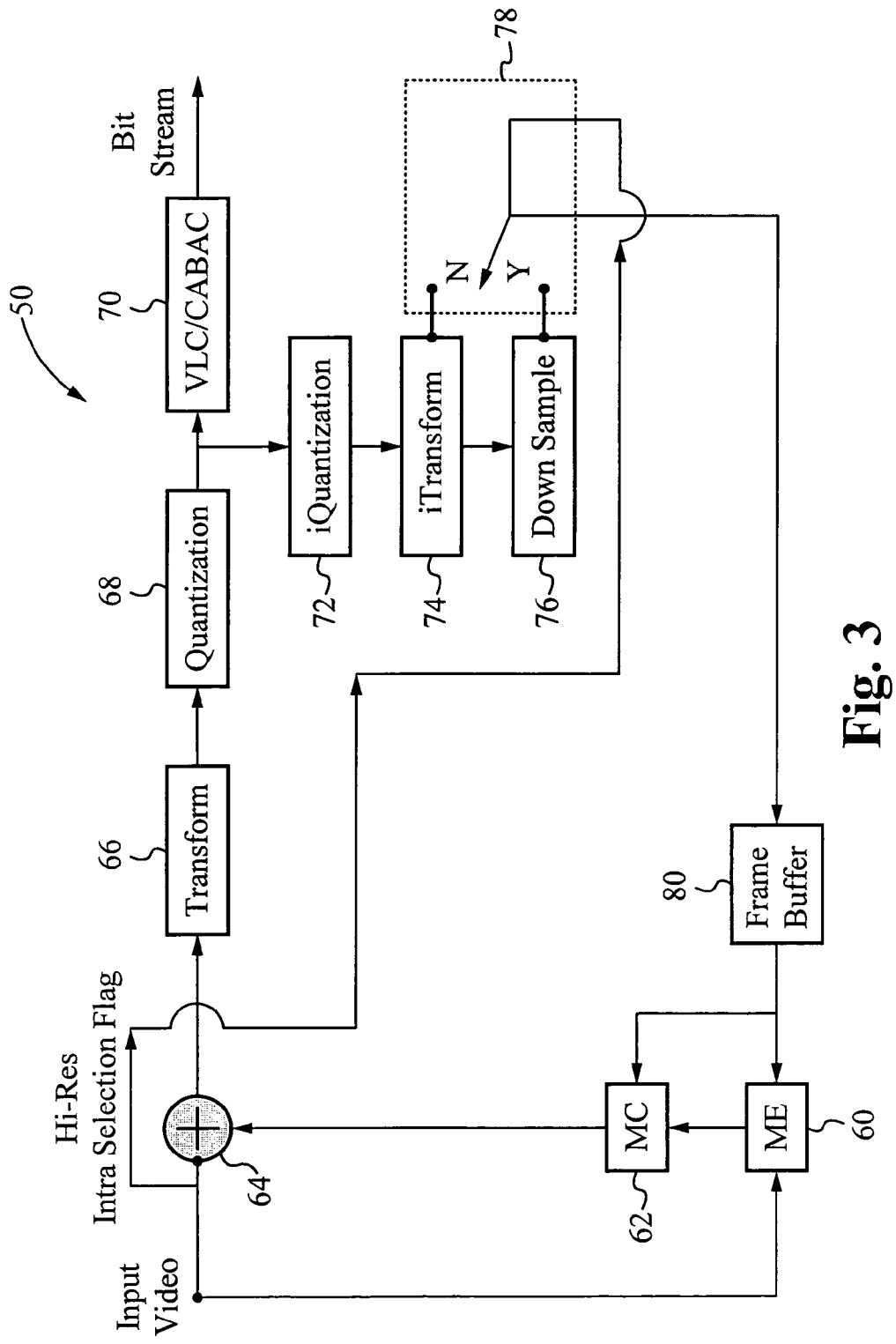
FIG. 3 illustrates an exemplary block diagram of the encoder from FIG. 2.

FIG. 3 illustrates an exemplary block diagram of the encoder 50 from FIG. 2. The encoder 50 includes a motion estimation (ME) module 60, a motion compensation (MC) module 62, a comparator 64, a transform module 66, a quantization module 68, a VLC/CABAC module 70, an inverse quantization module 72, an inverse transform module 74, a down-sample module 76, a high resolution still image selection switch 78, and a frame buffer 80. At the encoder side, as shown in FIG. 3, the coding of a high resolution still image, S-I-picture, is flagged and it is coded similarly to the coding of high resolution video in Intra mode (I-pictures). The key difference is that the encoder stores a down-sampled version of the S-I-picture in the frame buffer 80 to be used as a reference picture for the subsequent lower resolution P-pictures and B-pictures. A signal is sent to the switch 78 when a high resolution still image is present. In response to the signal, a switch connection is made to the down-sample module 76 such that the down-sampled version of the current frame, which is an S-I-picture, is transmitted to the frame buffer 80. To minimize the complexity of the encoder, the coding of I-pictures is designed in such a way as to handle the real time requirements of both video and still image coding.

At the decoder side, if an image display device, such as a camcorder, is in a digital still image mode, a high resolution still image, S-I-picture, is accessed, decoded, and displayed. In a video mode, a down-sampled version of the decoded high resolution still image is displayed and stored in the frame buffer for further reference to P-pictures and B-pictures. Similar to the encoder side, the decoder is designed in such a way as to handle the realtime decoding of higher resolution I-pictures. In some embodiments, a decoder is configured similarly to the encoder 50, with the exception that the decoder does not include a motion estimation module and the presence of a high resolution still image is signaled by a modified sequence parameter set, that is present or mandatory at the start of a GOP, if the GOP starts with an S-I-picture. The process flow of the decoder is reversed from that of the encoder.

Figure 4:
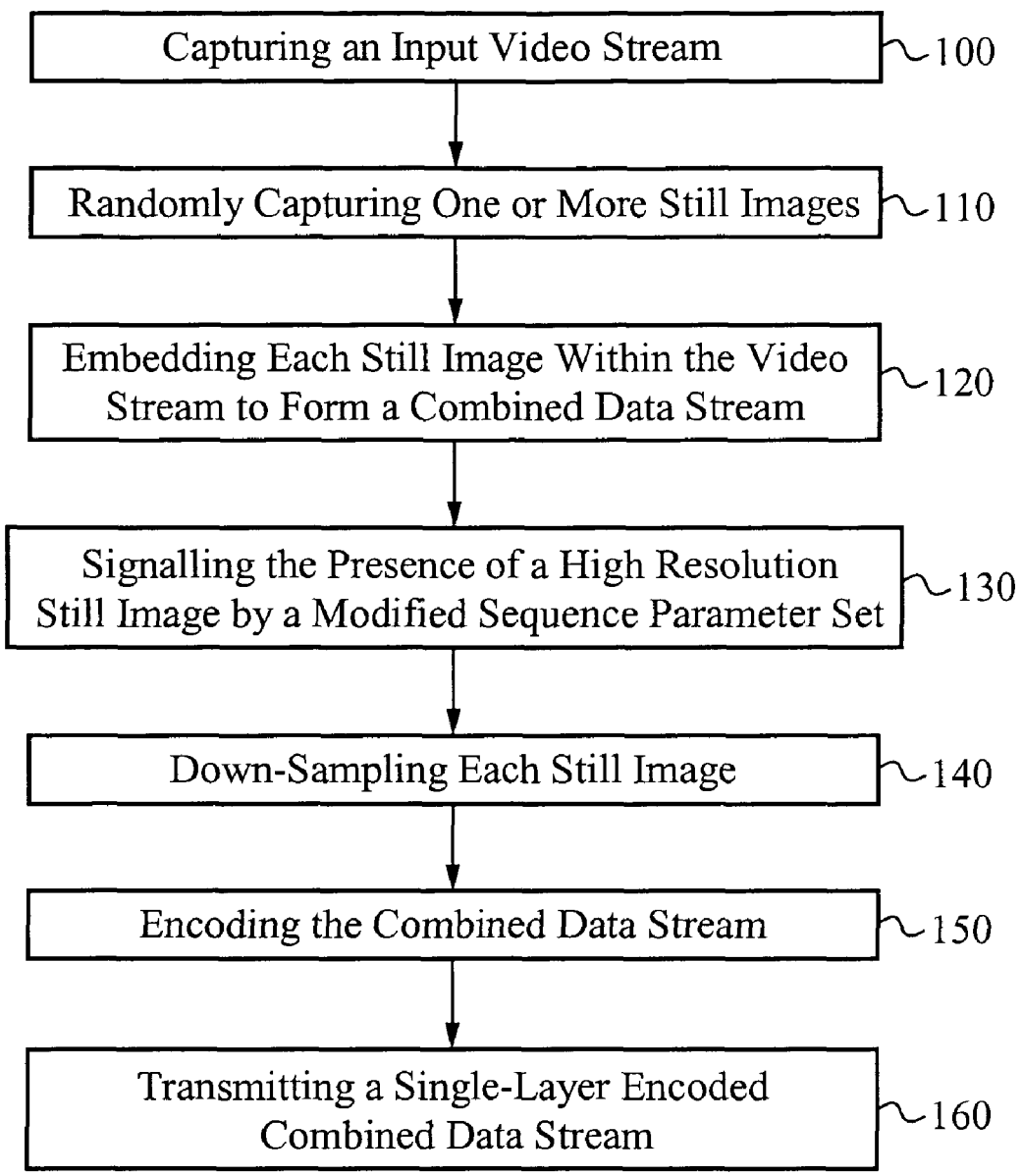
FIG. 4 illustrates a method of coding high resolution still images in series with the AVC coding of a lower resolution video stream.

FIG. 4 illustrates a method of encoding high resolution still images in series with the AVC coding of a lower resolution video stream. At the step 100, the input video stream is captured. At any random instant of time, a high resolution still image is captured at the step 110. Other still images can be captured at other instances of time. At the step 120, each captured high resolution still image is embedded within the video stream thereby forming a combined data stream including the embedded high resolution still images and the video frames of the input video stream. Each high resolution still image is embedded within the video stream at the point corresponding to the instant in time in which the high resolution still image was captured. At the step 130, the presence of a high resolution still image is signaled by a modified sequence parameter set, that is present or mandatory at the start of a GOP if the GOP starts with an S-I-picture.

In this embodiment, each high resolution still image is used as a predictive reference for encoding the P-pictures and the B-pictures in the video stream. However, the resolution of the high resolution still image is too high for this purpose. At the step 140, each high resolution still image is down-sampled, and the down-sampled version of the high resolution still image is stored in a buffer. At the step 150, the combined data stream is encoded, where the down-sampled version of the high resolution still image is used as a predictive reference for encoding appropriate P-pictures and B-pictures within the combined data stream. At the step 160, the encoded combined data stream is transmitted from the encoder to the decoder as a single-layer transmission.

Figure 5:
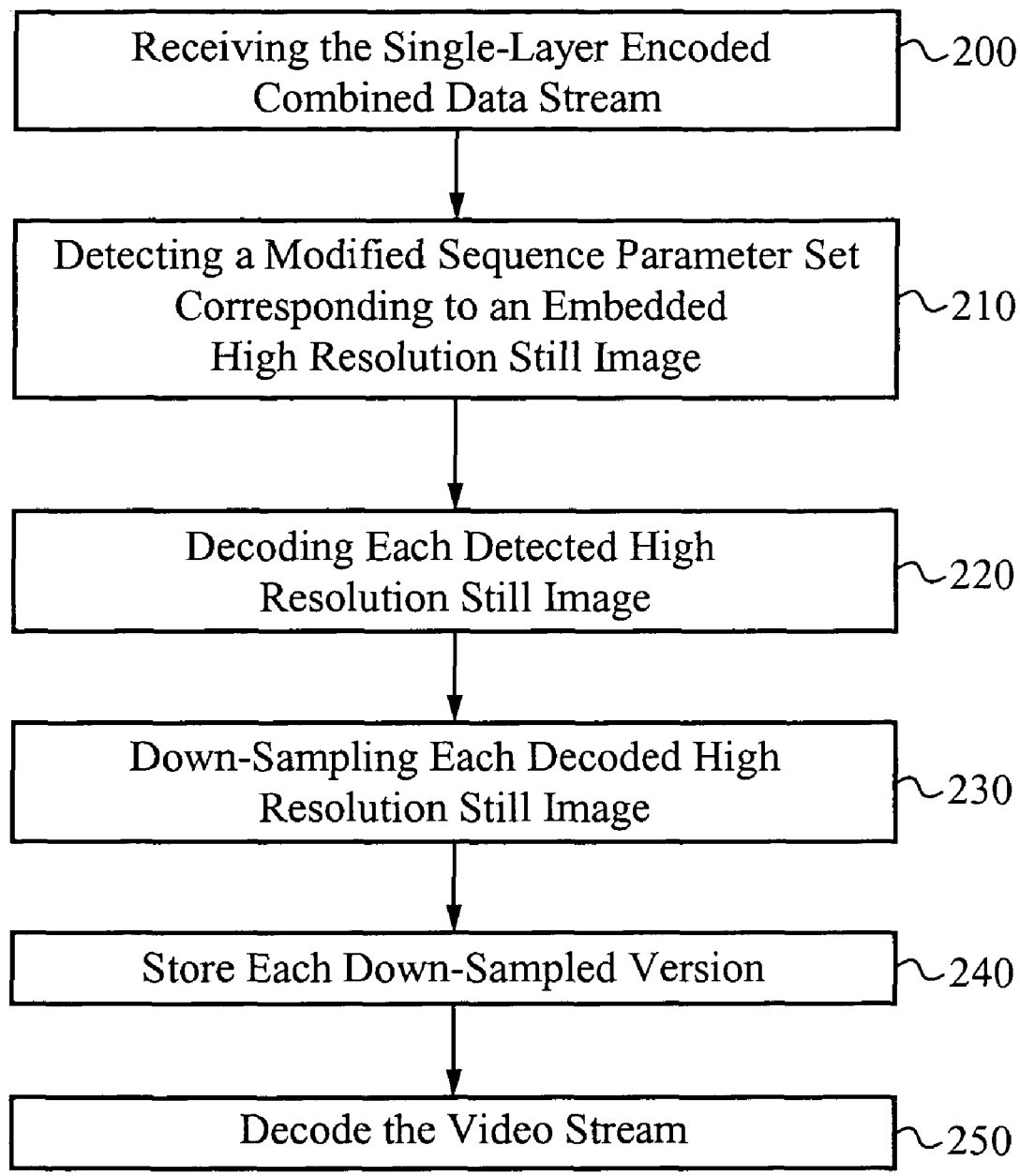
FIG. 5 illustrates a method of decoding the single-layer data stream to form the high resolution still images.

FIG. 5 illustrates a method of decoding the single-layer data stream to form the high resolution still images. At the step 200, the decoder receives the single-layer encoded combined data stream transmitted at the step 160 (FIG. 4). At the step 210, the presence of modified sequence parameter sets (SPS) indicate by the use of new profile definitions, the presence of S-I pictures within the received combined data stream thereby detecting an embedded high resolution still image within the combined data stream. For each such SPS detected, a corresponding high resolution still image is decoded at the step 220. At the step 230, each decoded high resolution still image is down-sampled. At the step 240, the down-sampled version of the high resolution still image is stored in a buffer. At the step 250, the video frames with the combined data stream are decoded. In one embodiment, the down-sampled version of the high resolution still image is used as a predictive reference for encoding appropriate P-pictures and B-pictures.

To modify the existing AVC standard to support random capture of high resolution still images, the existing AVC standard is extended to enable high resolution still images to be incorporated at random intervals of time into a serial stream of video frames, and to signal the decoder that the high resolution still images are included in the video stream. A sequence parameter set defines the characteristics of the video stream at a particular instant in time.

The modified AVC standard includes a modified sequence parameter set (SPS) RBSP syntax. In one embodiment, the modified sequence parameter set signals the presence of a high resolution still image by defining a new profile indicator and setting a corresponding flag to signal image characteristics such as the width and height of the high resolution still image. The following is an exemplary modified SPS RBSP syntax:

```
seq_parameter_set_rbsp( ) {
    profile_idc
    constraint_set0_flag
    constraint_set1_flag
    constraint_set2_flag
    constraint_set3_flag
    reserved_zero_4bits /* equal to 0 */
    level_idc
seq_parameter_set_id
if (profile_idc = = 'NNN') {//new un-used 8-bit integer for profile
    indicator for sequential mode
    intra_still_picture_present_flag
}
if (profile_idc = = 100 || profile_idc = = 110 ||
    profile_idc = = 122 || profile_idc = = 144 ||
    profile_idc = = 83)) {
    chroma_format_idc
    if( chroma_format_idc = = 3)
        residual_colour_transform_flag
    bit_depth_luma_minus8
    bit_depth_chroma_minus8
    qpprime_y_zero_transform_bypass_flag
    seq_scaling_matrix_present flag
    if( seq_scaling_matrix_present_flag)
        for( i = 0; i < 8; i++) {
            seq_scaling_list_present_flag[i]
            if( seq_scaling_list_present_flag[i])
                if( i < 6)
                    scaling_list( ScalingList4x4[i], 16,
                        UseDefaultScalingMatrix4x4Flag[i])
                else
                    scaling list( ScalingList8x8[i-6], 64,
                        UseDefaultScalingMatrix8x8Flag[i-6])
        }
}
log2_max_frame_num_minus4
pic_order_cnt_type
if( pic_order_cnt_type = = 0)
    log2_max_pic_order_cnt_lsb_minus4
else if( pic_order_cnt_type = = 1) {
    delta_pic_order_always_zero_flag
        offset_for_non_ref_pic
        offset_for_top_to_bottom_field
        num_ref_frames_in_pic_order_cnt_cycle
        for( 1 = 0; i
            < num_ref_frames_in_pic_order_cnt_cycle; i++)
            offset_for_ref_frame[i]
}
    num_ref_frames
    gaps_in_frame_num_value_allowed_flag
    pic_width_in_mbs_minus1
    pic_height_in_map_units_minus1
    if( intra_still_picture_present_flag) {
        still_pic_width_in_mbs_minus1
        still_pic_height_in_map_units_minus1
    }
    frame_mbs_only_flag
    if( !frame_mbs_only_flag)
        mb_adaptive_frame_field_flag
    direct_8x8_inference_flag
    frame_cropping_flag
    if( frame_cropping_flag) {
        frame_crop_left_offset
        frame_crop_right_offset
```

-continued

```
        frame_crop_top_offset
        frame_crop_bottom_offset
    }
    vui_parameters_present_flag
    if( vui_parameters_present_flag)
        vui_parameters( )
    rbsp_trailing_bits( )
}
```

The parameter "still_pic_width_in_mbs_minus1" plus 1 specifies the width of each decoded high resolution still picture in units of macroblocks. The parameter "still_pic_height_in_map_units_minus1" plus 1 specifies the height in slice group map units of a decoded frame of the high resolution still picture.

It is understood that the syntax used above to define the modified sequence parameter set is for exemplary proposes and that alternative syntax can be used to define the modified sequence parameter set.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A method of encoding data, the method comprising:
    a. capturing a video stream of data, wherein the video stream includes a plurality of successive video frames of data;
    b. capturing one or more still images, wherein each still image is captured at a random interval of time relative to the video stream;
    c. embedding each still image within the video frames in series, thereby forming a combined data stream;
    d. signaling a presence of a high resolution still image by using a new profile definition in a modified sequence parameter set;
    e. encoding the combined data stream; and
    f. transmitting the encoded combined data stream as a single-layer transmission.

2. The method of claim 1 further comprising down-sampling each captured high resolution still image and storing a down-sampled version of each still image for use as a reference image for subsequent frames in the video stream.

3. The method of claim 2 further comprising converting image characteristics associated with each captured still image to video characteristics such that the down-sampled version of each still image matches the characteristics of the video.

4. The method of claim 3 wherein encoding the combined data stream includes encoding the video frames according to the down-sampled version of each still image.

5. The method of claim 1 wherein each embedded still image indicates a new GOP.

6. The method of claim 5 wherein each still image is randomly embedded within the combined data stream.

7. The method of claim 6 wherein each GOP is variable in size.

8. The method of claim 1 wherein the combined data stream is encoded according to a modified AVC standard.

9. The method of claim 1 further comprising:
a. receiving the single-layer transmission;
b. detecting an occurrence of each embedded still image by a presence of a modified sequence parameter set;
c. decoding each detected still image; and
d. decoding each video frame.

10. The method of claim 9 further comprising down-sampling each decoded still image and storing a down-sampled version of each still image.

11. The method of claim 10 further comprising converting image characteristics associated with each decoded still image to video characteristics such that the down-sampled version of each still image matches the characteristics of the video stream.

12. The method of claim 11 wherein decoding each video frame includes decoding each video frame according to the down-sampled version of each still image if the still image is used as a reference for prediction.

13. The method of claim 1 wherein each still image comprises a high resolution still image.

14. The method of claim 1 wherein each video frame comprises a low resolution video frame.

15. The method of claim 1 wherein a frame rate of the video stream is independent of a frame rate of the one or more still images.

16. A system to encode data comprising:
a. a video capturing module to capture a video stream of data, wherein the video stream includes a plurality of successive video frames of data;
b. a still image capturing module to capture one or more still images, wherein each still image is captured at a random interval of time relative to the video stream;
c. a processing module to embed each captured still image within the video frames and to set a modified sequence parameter set to signal a presence of each still image, thereby generating a combined data stream;
d. an encoder to encode the combined data stream, thereby forming an encoded combined data stream; and
e. a transmitter to transmit the encoded combined data stream as a single-layer transmission.

17. The system of claim 16 wherein the encoder includes a down-sampling module to down-sample each still image and a buffer to store a down-sampled version of each still image.

18. The system of claim 17 wherein the encoder is configured to convert image characteristics associated with each captured still image to video characteristics such that the down-sampled version of each still image matches the characteristics of the video.

19. The system of claim 18 wherein the encoder is configured to encode the combined data stream by encoding the video frames according to the down-sampled version of each still image.

20. The system of claim 16 wherein the processing module is configured to define a modified sequence parameter set and add the parameter set at every occurrence of the still image in the video stream to signal a presence of the still image and start of a new GOP.

21. The system of claim 20 wherein the processing module is further configured to define one or more still image parameters, wherein each still image parameter defines a characteristic of the still image such as one or more of image height and image width.

22. The system of claim 16 wherein each embedded still image indicates a new GOP.

23. The system of claim 22 wherein each still image is randomly embedded within the combined data stream.

24. The system of claim 23 wherein each GOP is variable in size.

25. The system of claim 16 wherein the combined data stream is encoded according to a modified AVC standard.

26. The system of claim 16 wherein each still image comprises a high resolution still image.

27. The system of claim 16 wherein each video frame comprises a low resolution video frame.

28. The system of claim 16 wherein the frame rate of the video stream is independent of the frame rate of the one or more still images.

29. A system to decode data comprising:
a. a receiver to receive an encoded data stream as a single-layer transmission, wherein the encoded data stream includes one or more still images embedded within a plurality of video frames;
b. a processing module to detect a presence of an embedded still image by parsing contents of a modified sequence parameter set; and
b. a decoder to decode each still image embedded within the encoded data stream and to decode each encoded video frame to form a video stream of data, wherein each still image is decoded at a random interval of time relative to the video stream.

30. The system of claim 29 wherein the decoder includes a down-sampling module to down-sample each still image and a buffer to store a down-sampled version of each still image.

31. The system of claim 30 wherein the decoder is configured to convert image characteristics associated with each decoded still image to video characteristics such that the down-sampled version of each still image matches characteristics of the video stream.

32. The system of claim 31 wherein the decoder is configured to decode each encoded video frame by decoding each appropriate video frame according to the down-sampled version of each still image when the still image is used as a reference.

33. The system of claim 29 wherein the processing module is configured to detect one or more still image parameters, wherein each still image parameter defines a characteristic of the still image such as one or more of image height and image width.

34. The system of claim 29 wherein each embedded still image indicates a new GOP.

35. The system of claim 34 wherein each still image is randomly embedded within the encoded data stream.

36. The system of claim 35 wherein each GOP is variable in size.

37. The system of claim 29 wherein the encoded data stream is encoded according to a modified AVC standard.

38. The system of claim 29 wherein each still image comprises a high resolution still image.

39. The system of claim 29 wherein each video frame comprises a low resolution video frame.

40. The system of claim 29 wherein a frame rate of the video stream is independent of a frame rate of the one or more still images.

41. A system to encode and decode data, the system comprising:
a. a video capturing module to capture a first video stream of data, wherein the first video stream includes a plurality of successive video frames of data;
b. a still image capturing module to capture one or more still images, wherein each still image is captured at a random interval of time relative to the first video stream;
c. a processing module to embed each captured still image within the video frames of the first video stream and to set a sequence parameter set to signal a presence of the still image, thereby generating a first data stream;
d. an encoder to encode the first data stream, thereby forming a first encoded data stream;
e. a transceiver to transmit the first encoded data stream as a first single-layer transmission, and to receive a second encoded data stream as a second single-layer transmission; and
f. a decoder to decode each still image embedded within the second encoded data stream and to decode each encoded video frame within the second encoded data stream to form a second video stream of data.

42. The system of claim 41 wherein the encoder includes a down-sampling module to down-sample each still image and a buffer to store a down-sampled version of each still image.

43. The system of claim 41 wherein the decoder includes a down-sampling module to down-sample each still image and a buffer to store a down-sampled version of each still image.

* * * * *